United States Patent [19]
Lengyel

(10) Patent No.: US 7,230,624 B2
(45) Date of Patent: Jun. 12, 2007

(54) METHOD AND APPARATUS FOR MODELING AND REAL-TIME RENDERING OF SURFACE DETAIL

(75) Inventor: Jerome E. Lengyel, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 35 days.

(21) Appl. No.: 11/180,327

(22) Filed: Jul. 13, 2005

(65) Prior Publication Data

US 2005/0248572 A1 Nov. 10, 2005

Related U.S. Application Data

(63) Continuation of application No. 09/887,412, filed on Jun. 21, 2001, now Pat. No. 6,940,508.

(51) Int. Cl.
*G06T 17/00* (2006.01)

(52) U.S. Cl. ............... 345/428; 345/419; 345/420; 345/422; 345/426; 345/427; 345/581; 345/582; 345/583; 345/586

(58) Field of Classification Search ............... 345/419, 345/420, 423, 427, 428, 581, 582, 589, 426, 345/583, 586
See application file for complete search history.

(56) References Cited

U.S. PATENT DOCUMENTS

| 5,758,046 A | 5/1998 | Rouet et al. | |
| 5,764,233 A * | 6/1998 | Brinsmead et al. | 345/419 |
| 6,271,847 B1 * | 8/2001 | Shum et al. | 345/418 |

OTHER PUBLICATIONS

Lengyel et al.; "Real-Time Fur over Arbitrary Surfaces", 6 pages.
Neyret, "Modeling Animating and Rendering Complex Scenes", 15 pages.
Meyer et al., "Interactive Volumetric Textures", 12 pages.
Zockler et al., "Interactive Visualization of 3D-Vector Fields Using Illuminated Stream Lines", 1996 IEEE, pp. 107-113 and 474.
Kim et al. "A thin Shell Volume for Modeling Human Hair", IEEE, Published May 3-5, 2000, pp. 104-111.

* cited by examiner

*Primary Examiner*—Kimbinh T. Nguyen
(74) *Attorney, Agent, or Firm*—Lee & Hayes, PLC

(57) ABSTRACT

A method comprising generating a surface detail model using a modeling technique, and rendering surface detail in accordance with the developed surface detail model over an object surface. The described method enables computer-generated images containing representations of hair to be rendered in real time.

20 Claims, 6 Drawing Sheets

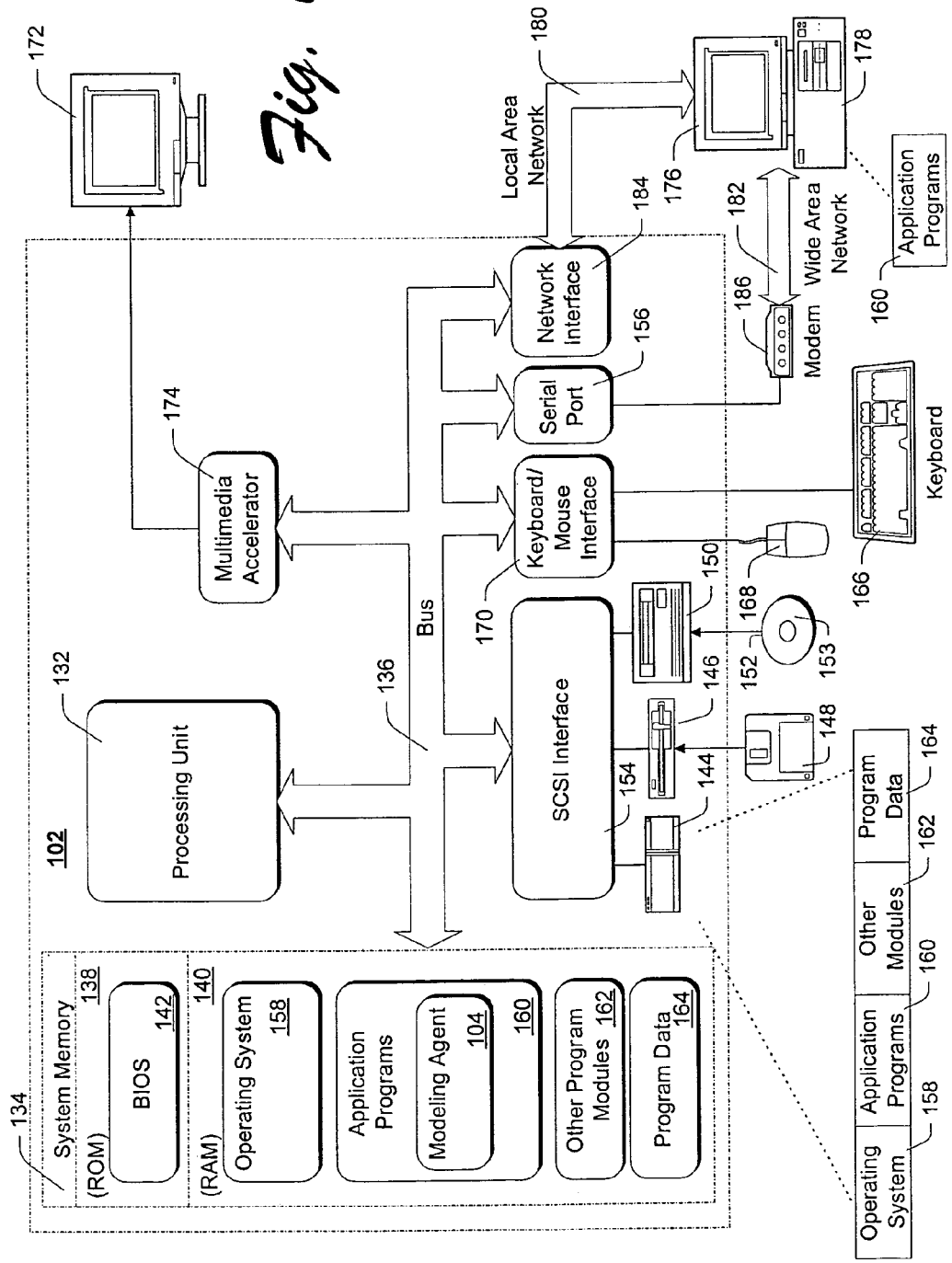

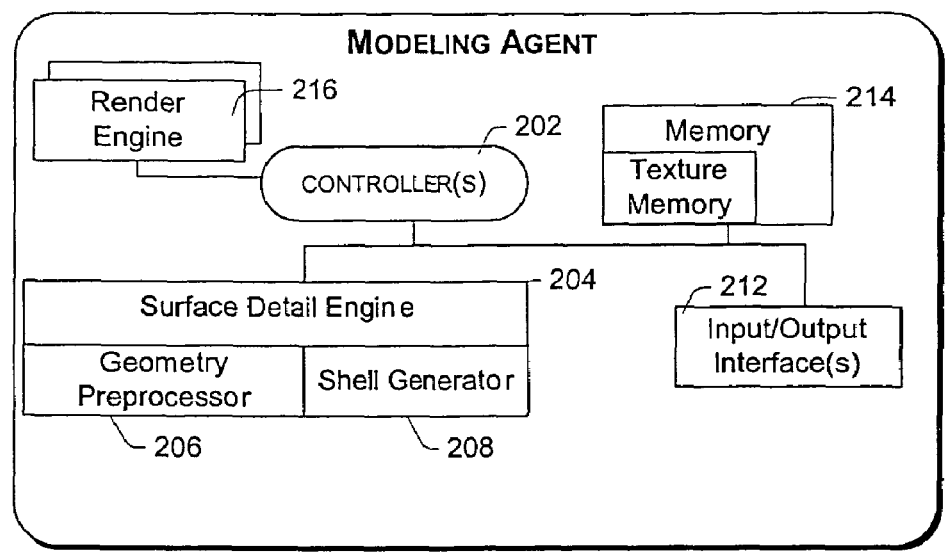
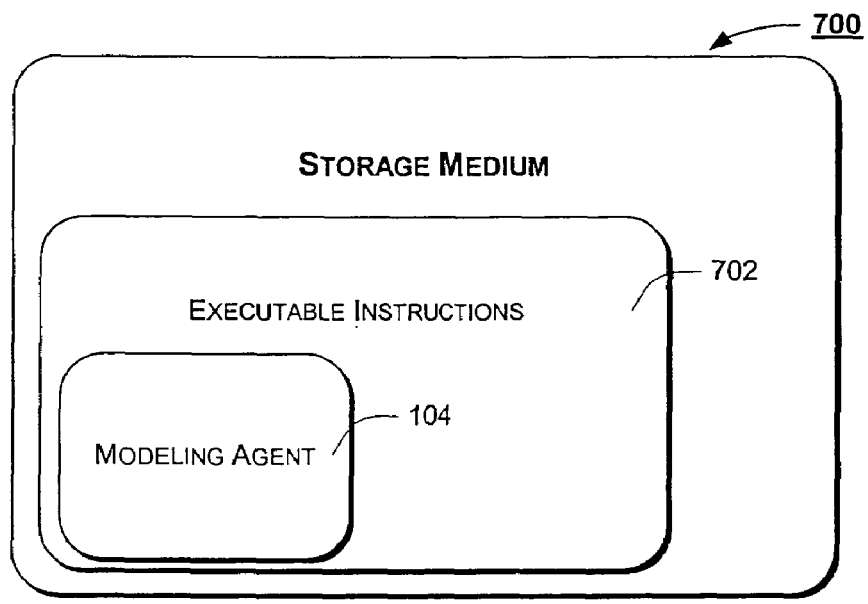

METHOD AND APPARATUS FOR MODELING AND REAL-TIME RENDERING OF SURFACE DETAIL

RELATED APPLICATIONS

This continuation patent application Ser. No. 09/887,412 claims priority to pending U.S. Pat. No. 6,940,508 to Jerome E. Lengyel, filed Jun. 21, 2001, issued Sep. 6, 2005, and entitled, "A Method And Apparatus for Modeling and Real-Time Rendering of Surface Detail."

TECHNICAL FIELD

This invention generally relates to computer graphics and, more particularly, to a method and apparatus for modeling and rendering surface detail.

BACKGROUND

Recent advances in computing power and related technology have fostered the development of a new generation of powerful software applications. Gaming applications, communications applications, and multimedia applications have all benefited from increased processing power and clocking speeds. Indeed, the field of computer graphics, leveraged by a myriad of applications, has particularly benefited by the improved processing capability found in even the most rudimentary computing devices. Examples abound, from gaming applications which once utilized simple stick figures are now capable of rendering near life-like images of people, animals, and the like. In the realm of media, movies that once relied on clumsy animation for special effects now benefit from the ability to render life-like computer images.

This ability to create and render life-like characters has added a level of realism and personality to gaming applications, modeling applications, multimedia applications, and the like. While the increased processing power/speed has improved the quality of the rendered images used in such applications, a number of problems remain in generating life-like characters in near real-time to support interactive applications such as, for example, gaming applications, multimedia applications where the user dynamically controls camera angles and proximity to subject of the media content. One major problem that remains in generating and rendering life-like characters in near real-time is the inability of current computer graphics technology to dynamically render realistic hair (used interchangeably herein with fur, scales, etc.).

One of the distinguishing characteristics of mammals is that they are covered in hair (used interchangeable herein to describe hair, fur, scales, etc.). Thus, in order to render a life-like representation of such a mammal, the application modeling the creature must attempt to cover at least select surfaces of the character in hair. Prior art approaches to modeling such surface characteristics relied on ray-tracing, Introduced by Kajiya and Kay in a presentation entitled *Rendering fur with three dimensional textures*, in the Proceedings of SIGGRAPH 1989, pages 271–280. In the Kajiya et al. ray-traced approach, a model with explicit geometric detail is represented as a volume of textures. While fine geometric modeling of surface features using ray tracing can provide convincing surface features, it is computationally expensive and is not, therefore, conducive to an application that supports interactive features.

Thus, a method and apparatus for modeling and rendering surface detail is presented, unencumbered by the deficiencies and limitations commonly associated with the prior art.

SUMMARY

This invention concerns a method and apparatus for modeling and rendering surface detail. In accordance with a first example embodiment, a method is presented comprising developing a surface detail model and rendering surface detail in accordance with the developed surface detail model over an object surface. In accordance with the teachings of the present invention, the surface detail model to render view-dependent level of surface detail over the object surface using a shell texture model.

BRIEF DESCRIPTION OF THE DRAWINGS

The same reference numbers are used throughout the figures to reference like components and features.

FIG. 1 is a block diagram of a computer system incorporating the teachings of the present invention;

FIG. 2 is a block diagram of an example of a modeling agent including an example geometry preprocessor and surface detail engine, according to one example implementation of the invention;

FIG. 7 presents a graphical illustration of an example storage medium including instructions which, when executed, implement the teachings of the present invention, according to one embodiment of the present invention; and

DETAILED DESCRIPTION

Figure 3:
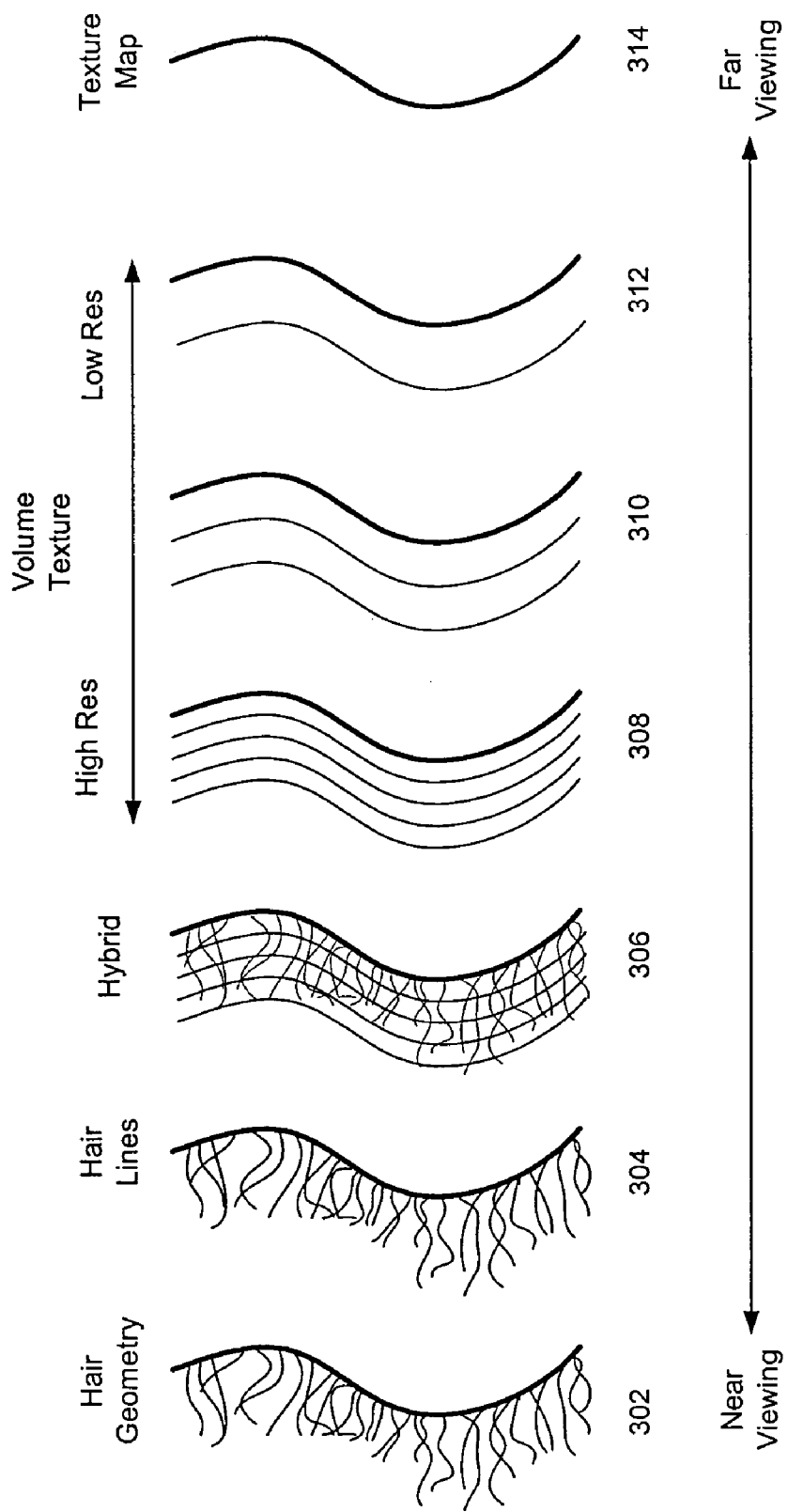
FIG. 3 graphically illustrates several level-of-detail representations spanning near-to-far viewing.

This invention concerns a method and apparatus for modeling and rendering surface detail. According to one example implementation, developed more fully below, the method and apparatus utilizes geometry and texture preprocessing features to generate a surface detail model which is leveraged to facilitate substantially real-time rendering of objects with impressive surface detail, e.g., hair, thereby facilitating rendering of incredibly lifelike characters in support of such interactive applications as gaming applications, multimedia applications, and the like. In the discussion herein, the invention is described in the general context of computer-executable instructions, such as program modules, being executed by one or more conventional computers. Generally, program modules include routines, programs, objects, components, data structures, etc. that perform particular tasks or implement particular abstract data types. Moreover, those skilled in the art will appreciate that the invention may be practiced with other computer system configurations, including hand-held devices, personal digital assistants, multiprocessor systems, microprocessor-based or programmable consumer electronics, network PCs, minicomputers, mainframe computers, and the like. In a distributed computer environment, program modules may be located in both local and remote memory storage devices. It is noted, however, that modification to the architecture and methods described herein may well be made without deviating from spirit and scope of the present invention.

Example Computer System

FIG. 1 illustrates an example computer system 102 including a modeling agent 104, which generates a surface detail model leveraged to render the surface detail of an object or character (used interchangeably herein). Unlike the conventional approaches for generating such surface detail described above, modeling agent 104 implements an innovative surface detail engine (204) to generate a surface detail model that is used to render lifelike surface detail in substantially real-time. In this regard, the modeling agent 104 in general, and the surface detail engine 204 in particular, are well suited to applications wherein real-time rendering of lifelike characters is required.

It should be appreciated that although depicted as a separate, stand alone application in FIG. 1, modeling agent 104 (or, surface detail engine, for that matter) may well be implemented as a function of an application, e.g., a gaming application, a multimedia application, a personal assistant/representative ("avatar") application, a video conferencing application, and the like. It will be evident, from the discussion to follow, that computer 102 is intended to represent any of a class of general or special purpose computing platforms which, when endowed with the innovative modeling agent 104, implement the teachings of the present invention. Moreover, although depicted as a software application in the general context of FIG. 1, computer system 102 may alternatively support a hardware implementation of modeling agent 104 as well, e.g., as an application specific integrated circuit (ASIC), programmable logic array (PLA), dedicated micro-controller, etc. In this regard, but for the description of modeling agent 104, the following description of computer system 102 is intended to be merely illustrative, as computer systems of greater or lesser capability may well be substituted without deviating from the spirit and scope of the present invention.

As shown, computer 102 includes one or more processors or processing units 132, a system memory 134, and a bus 136 that couples various system components including the system memory 134 to processors 132.

The bus 136 represents one or more of any of several types of bus structures, including a memory bus or memory controller, a peripheral bus, an accelerated graphics port, and a processor or local bus using any of a variety of bus architectures. The system memory includes read only memory (ROM) 138 and random access memory (RAM) 140. A basic input/output system (BIOS) 142, containing the basic routines that help to transfer information between elements within computer 102, such as during start-up, is stored in ROM 138. Computer 102 further includes a hard disk drive 144 for reading from and writing to a hard disk, not shown, a magnetic disk drive 146 for reading from and writing to a removable magnetic disk 148, and an optical disk drive 150 for reading from or writing to a removable optical disk 152 such as a CD ROM, DVD ROM or other such optical media. The hard disk drive 144, magnetic disk drive 146, and optical disk drive 150 are connected to the bus 136 by a SCSI interface 154 or some other suitable bus interface. The drives and their associated computer-readable media provide nonvolatile storage of computer readable instructions, data structures, program modules and other data for computer 102.

Although the exemplary environment described herein employs a hard disk 144, a removable magnetic disk 148 and a removable optical disk 152, it should be appreciated by those skilled in the art that other types of computer readable media which can store data that is accessible by a computer, such as magnetic cassettes, flash memory cards, digital video disks, random access memories (RAMs) read only memories (ROM), and the like, may also be used in the exemplary operating environment.

A number of program modules may be stored on the hard disk 144, magnetic disk 148, optical disk 152, ROM 138, or RAM 140, including an operating system 158, one or more application programs 160 including, for example, the innovative modeling agent 104 incorporating the teachings of the present invention, other program modules 162, and program data 164 (e.g., resultant language model data structures, etc.). A user may enter commands and information into computer 102 through input devices such as keyboard 166 and pointing device 168. Other input devices (not specifically denoted) may include a microphone, joystick, game pad, satellite dish, scanner, or the like. These and other input devices are connected to the processing unit 132 through an interface 170 that is coupled to bus 136. A monitor 172 or other type of display device is also connected to the bus 136 via an interface, such as a video adapter 174. In addition to the monitor 172, personal computers often include other peripheral output devices (not shown) such as speakers and printers.

As shown, computer 102 includes networking facilities with which to operate in a networked environment using logical connections to one or more remote computers, such as a remote computer 176. The remote computer 176 may be another personal computer, a personal digital assistant, a server, a router or other network device, a network "thin-client" PC, a peer device or other common network node, and typically includes many or all of the elements described above relative to computer 102, although only a memory storage device 178 has been illustrated in FIG. 1.

As shown, the logical connections depicted in FIG. 1 include a local area network (LAN) 180 and a wide area network (WAN) 182. Such networking environments are commonplace in offices, enterprise-wide computer networks, Intranets, and the Internet. In one embodiment, remote computer 176 executes an Internet Web browser program such as the INTERNET EXPLORER Web browser manufactured and distributed by MICROSOFT CORPORATION of Redmond, Wash. to access and utilize online services.

When used in a LAN networking environment, computer 102 is connected to the local network 180 through a network interface or adapter 184. When used in a WAN networking environment, computer 102 typically includes a modem 186 or other means for establishing communications over the wide area network 182, such as the Internet. The modem 186, which may be internal or external, is connected to the bus 136 via an input/output (I/O) interface 156. In addition to network connectivity, I/O interface 156 also supports one or more printers 188. In a networked environment, program modules depicted relative to the personal computer 102, or portions thereof, may be stored in the remote memory storage device. It will be appreciated that the network connections shown are exemplary and other means of establishing a communications link between the computers may be used.

Generally, the data processors of computer 102 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the innovative steps described below in conjunction with a microprocessor or other data processor. The invention also includes the computer itself when programmed according to the methods and techniques described below. Furthermore, certain sub-components of the computer may be programmed to perform the functions and steps described below. The invention includes such sub-components when they are programmed as described. In addition, the invention described herein includes data structures, described below, as embodied on various types of memory media.

For purposes of illustration, programs and other executable program components such as the operating system are illustrated herein as discrete blocks, although it is recognized that such programs and components reside at various times in different storage components of the computer, and are executed by the data processor(s) of the computer.

Example Modeling Agent

FIG. 2 illustrates a block diagram of an example modeling agent 104 incorporating the teachings of the present invention. As shown, modeling agent 104 is comprised of one or more controllers 202, surface detail engine 204, input/output interface(s) 212, memory 214 and, optionally, one or more application(s) 216 (e.g., graphical user interface, gaming application, virtual bank teller application, etc.), coupled as shown. It will be appreciated that although depicted in FIG. 2 as a number of disparate blocks, one or more of the functional elements of the modeling agent 104 may well be combined. In this regard, modeling agents of greater or lesser complexity which generate life-like surface detail in substantially real-time may well be employed without deviating from the spirit and scope of the present invention.

As alluded to above, although depicted as a separate functional element, modeling agent 104 may well be implemented as a function of a higher level application, e.g., a gaming application, a multimedia application, a video conferencing application, and the like. In this regard, controller(s) 202 of modeling agent 104 are responsive to one or more instructional commands from a parent application to selectively invoke one or more features of modeling agent 104. Alternatively, modeling agent 104 may well be implemented as a stand-alone tool for generating lifelike surface detail in substantially real-time in response to user or external application input. In either case, controller(s) 202 of modeling agent 104 selectively invoke one or more of the functions of surface detail engine 204 to generate a surface detail model, which is leveraged by a rendering application to generate lifelike surface detail for objects/characters. Thus, except as configured to effect the teachings of the present invention, controller 202 is intended to represent any of a number of alternate control systems known in the art including, but not limited to, a microprocessor, a programmable logic array (PLA), a micro-machine, an application specific integrated circuit (ASIC) and the like. In an alternate implementation, controller 202 is intended to represent a series of executable instructions to implement the control logic described above.

As introduced above, surface detail engine 204 is selectively invoked to generate a surface detail model for an object that may be leveraged by a rendering engine (not shown) to generate lifelike surface detail in substantially real-time. More particularly, surface detail engine 204 generates a surface detail model that selectively invokes a method of modeling surface detail dependent upon any of a number of parameters including, for example, viewing parameters, global direction vectors, lighting parameters, shadowing information, and the like. According to one implementation, surface detail engine 204 uses one or more of a series of semi-transparent concentric shells to represent surface detail, depending on the parameters introduced above.

As shown, the surface detail engine 204 is depicted comprising a geometry preprocessing module 206 and a shell generation module 208, which are selectively invoked to generate a surface detail model of semi-transparent concentric shells. As will be developed in greater detail below, surface detail engine 204 models and renders surface detail using one or more of semi-transparent, concentric shells of hair texture to generate the surface detail for an object/character based, at least in part, on one or more viewing parameters. As used herein, the viewing parameters include any of a number of virtual conditions under which the user is viewing the object/character such as, for example, the viewing distance, lighting conditions, shadowing conditions, and the like. As will be described more fully below, surface detail engine 204 selectively implements any of a number of surface detail generation techniques, each suited to provide a lifelike rendering of the surface detail given the particular viewing situation.

According to one example implementation, prior to runtime (or rendering of the object), surface detail engine 204 is selectively invoked to generate a parametric model of the surface detail of an object. In this regard, surface detail engine 204 performs two primary functions: (1) geometric preprocessing, and (2) initial texture modeling, each discussed in detail, below. In general, geometry pre-processing of the object involves generating texture patches defining the surface of the object, while parametric texture modeling involves development of a geometric model of a patch of surface detail, and sampling it into surface elements used to cover an object's surface. In accordance with one aspect of the present invention, surface detail engine 204 utilizes one or more of semi-transparent concentric shells of textures to model the surface elements of an object.

Geometry (Surface) Model

As used herein, surface detail engine 204 works on a representation of the uncovered surface area of an object represented as a series of non-overlapping triangles, i.e., a triangular mesh representation of the surface features of an object. Surface detail engine 204 selectively invokes an instance of geometry preprocessing module 206 to generate the triangular mesh representation of the uncovered surface of an object. Once the mesh is created, geometry preprocessing module 206 simulates virtual hair in one or more of the elemental grids to develop volume texture. According to one implementation, geometry preprocessing module 206 utilizes any of a number of well-known particle systems to generate this virtual hair. The virtual hair is then sampled into a volume texture that is subsequently used to generate the surface element aspects of the surface detail model, i.e., the concentric shells.

To handle a full range of possible viewing configurations, view-dependent level-of-detail representations are used. FIG. 3 is a graphic illustration of several view-dependent level-of-detail representations that span near-to-far viewing.

For near views 302, 304, 306, the full geometry of each individual hair is modeled with an alpha-blended and textured line, where alpha is mapped to the width of the hair to support sub-pixel feature size, and the textures encode hair lighting and shadows.

As the hair recedes from the viewer, one or more volume shell representations 308, 310, 312 are used, which integrate over multiple hairs and capture the aggregate appearance of hair at this scale. The line-drawn hairs are faded from view by scaling alpha down to zero. Concentric, transparent, textured layers render the volume texture. The typical order in which the texture layers are drawn is from the skin outwards, since this is the typical viewing direction.

As the object moves further from the viewing perspective, the number of concentric shells needed to produce the proper parallax diminishes until reaching a default level in which a single texture map 314 suffices. The number of levels within a volumetric layer diminishes in step with the concentric shells. For both the number of samples within a layer and the number of layers within a volume shell, the levels are powers of 2 of one another. At the lowest level of detail, a single texture is rendered with an anisotropic model to capture the aggregate lighting (314).

The choice of which level of detail is active is based on the size of the projected hair features and the resolution of the texture samples. The goal is to represent the hair with the smallest number of samples that gives a good reconstruction. The texture samples are kept at approximately the same resolution as the screen pixels (similar to mip-mapping). The geometry of representation 302 is used when the feature size of the hair projects to larger than a single pixel. Representation 304 is used for hair feature sizes of one pixel down to around one-half pixel. The volumetric representations 308–312 are used for filtering features the rest of the way down in scale, with the vertical volume resolution, i.e., the number of concentric shell layers, tied to the scale of the texture samples.

Since the volumetric hair is a filtered version of the geometric hair, movement forwards or backwards in detail between the representations may be freely made. If a small patch of hair that is represented by both a volume texture and a procedural hair distribution is used initially, then the small patch can be placed on the surface of the input mesh using two-dimensional texture tiling of the input mesh texture domain. The tiling and the procedural hair distribution can then produce the geometric hairs needed for close-up viewing.

Alternately, if a model of a full head of hair is used initially, the hair can be filtered to produce faithful volume representations. This approach is scalable to allow for the rendering of long hair that flows laterally to track the scalp or skin, where each object in the scene uses a different volumetric texture.

This systematic management of level of detail is the key to efficient execution of the renderer. Image quality, however, depends on the modeling and shading described below.

Texture Model

In addition to the (surface) geometry model, surface detail engine 204 generates a texture model. As introduced above, to provide for improved surface detail realism, surface detail engine 204 invokes a shell texture generation module 208 to generate the texture model of surface detail for an object. As will be described in greater detail below, in accordance with render engine 216, the shell texture model is utilized when generating surface detail viewed from a distance, or under other conditions wherein high-resolution of the surface detail is not required (e.g., when viewing the object from a distance).

As introduced above, shell texture generation module 208 generates a shell texture based on the geometry of hair strands. The hair strands are generated through a particle system simulation, such as described in Reeves, W. T. *Particle Systems—a Technique for Modeling a Class of Fuzzy Objects*, ACM Transactions on Graphics, 2 (2), pages 91–108 (April 1983). The surface is first seeded with "curl" starting points by painting the seeds directly on the surface of the mesh. The seeds are then grown as particle system trajectories, and the hair is adjusted for a desired effect.

For example, the centerline of each hair is modeled as $X(t)=A+tB+t^2C$, where A is the initial position of the hair centerline, B is the velocity, and C is the acceleration. Other parameters include hair color, hair diameter, length, curliness, curl radius, and curl taper. The hair color and diameter are interpolated between a value at the base of the hair and a value at the tip of the hair. The "curl length" parameter determines the range of the "t" integration variable, which starts at t=0 and then continues until the arclength of the centerline (approximated by summing the geometric distance between each sample) equals the desired length. The hair curl is modeled by an offset from the centerline, $P(t)=X(t)+R(t) F(t)$, where P(t) is the modeled hair position, X(t) is the centerline, R(t) is the radius of the curl and F(t) is the current offset direction that rotates around the central axis. "Curliness" is the number of revolutions of the offset direction around the centerline axis. "Curl radius" is the radius of the offset. "Curl taper" controls how this radius changes along the length of the hair.

To instantiate other hairs near a seed, the parameters (such as A, B, and C as in the centerline example) are interpolated based on the distance from the seed to produce an intermediate set of parameters (e.g. $A2=(1-d) A0+d A1$, where d is the normalized distance between seed 0 and seed 1). These intermediate parameters are then used to make the final hair trajectory, which consists of a series of point samples containing position, color, and opacity. The seeds are interpolated to the desired density using a small test patch for quick feedback. The seeds are then propagated to the full mesh.

Shell textures: According to one implementation, generation of the shell textures utilizes a four-channel (RGBA) image for each layer of the shell model by overlaying a grid on the bounding box containing the hair strands. At each grid point we compute a color and opacity for that point. According to one implementation, the color and opacity for each grid point is computed by geometry preprocessing module utilizing a tall Gaussian filter with the geometric hair produced by the particle system hair model. The geometric hair is sampled finely at approximately ten times the sampling density of the texture image that is being created. Each of the geometric samples then assigns a portion of its value to the nearby texture samples. The portion used is a based on the distance from the texture sample to the geometric hair sample. The distance is mapped through the sampling filter function to produce a weighting value. The weighting value is multiplied by the geometric hair sample's color value and then added to the texture map sample. The filter is "tall" in the sense that the inter-shell spacing is much greater than the grid spacing within each shell. For the innermost shell, all samples are assigned full opacity (i.e., non-transparent) since this layer represents the skin surface.

With continued reference to FIG. 2, as used herein, the input/output interface(s) 212 and memory 214 are each intended to represent any of a number of I/O interface(s) and memory device(s) known in the art. I/O interface(s) 212 enable modeling agent 104 to interact with audio/video device(s), display devices, control devices (e.g., keyboard, mouse, etc.) and the like. In accordance with one example embodiment, I/O interface(s) 212 interface with the I/O interface(s) (156, 170, 184, etc.) of a host computing system 102 to interact with such devices.

Memory 214 is selectively used by controller(s) 202 and or functions 206, 208 and/or 210 to temporarily store information (e.g., textures) required to model and render such surface detail. According to one example implementation, memory 214 includes memory registers dedicated to storing textures, e.g., denoted as texture memory. In accordance with the teachings of the present invention, the stored textures include sixteen layers of 128×128 pixel shell texture. Depending on texture compression and the accuracy/detail required, texture memory space of 200 kb to 1.6 Mb may well be used. In this regard, memory 214 is intended to represent any of a wide variety of memory devices known in the art and, thus, need not be further described here.

As introduced above, modeling agent 104 may well include one or more application(s) such as, for example, an innovative render engine 216, which utilizes the resource of surface detail engine 204 to generate lifelike images in substantially real-time. While the present invention is described in the context of use with a render engine, those skilled in the art will appreciate that other applications (e.g., a gaming application) may well leverage the surface detailing capability of modeling agent 104 to generate lifelike images described herein. To fully illustrate the interaction between surface detail engine 204 and an example render engine, the operational attributes of an exemplary render engine 216 are developed more fully, below.

Render Engine

In addition to the modeling aspects of the present invention, disclosed above, modeling agent 104 is depicted incorporating an innovative render engine 216 to leverage the surface detail modeling capabilities of the surface detail engine 204. In general, render engine 216 performs two distinct tasks at runtime to generate realistic lifelike surface detail on objects, i.e., rendering of the surface and shells, each of which will be briefly described, below. According to one example implementation, the steps will be introduced in the order in which they are performed at runtime, i.e., surface rendering, shell texture detail. It is to be appreciated, however, that rendering in an alternate order is contemplated within the spirit and scope of the present invention.

Surface rendering: For each frame, render engine 216 renders an opaque version of the whole mesh. This includes both the innermost layer ("skin") of furry regions and the surface corresponding to the non-furry regions of the creature.

Shell rendering: Once the surface is rendered, render engine 216 generates the offset shells that provide the primary surface detail. A simple normal offset of vertex positions to a user-defined number of levels, m, and scale, h, is used to create a coordinate system on which to place the volume textures. The connectivity and texture coordinates of the offset mesh are identical to the input mesh. For vertex I of level 1:

$V_i^1 = V_i^0 + (h \cdot l/m)N,$ where $V_i^0$ is the original input vertex position, and N is the normal per vertex.

According to one example implementation, for each layer of shells (e.g., 16 layers) render engine 216 composites all the patches of the semi-transparent texture over what has already been rendered. During shell rendering, render engine 216 both tests and writes the Z-buffer, and enables alpha-testing to avoid writing Z for pixels with zero coverage. According to one implementation, render engine 216 enables texture wrapping so that the shell texture can tile across large patches.

As introduced above, to render the surface detail of an object, a render engine 216 leverages the information of the generated surface detail model along with a number of parametric considerations to generate realistic looking surface detail over an object. Some of the parameters considered have been introduced above. However, for ease of understanding and clarification, an exemplary set of render engine parametric controls and run-time parameters are presented in detail, below.

Render Engine Parametric Controls

In addition to mere application of the surface detail denoted above, render engine 216 includes a number of interactive features which enable a user, or an application, to further define viewing parameters of the rendered surface, providing for a more realistic animated character. While render engines with more or less functional capability may well utilize the innovative features of surface detail engine 204, render engine 216 includes the following features:

Hair shading: Render engine 216 dynamically modifies hair shading (or lighting) characteristics to simulate depth and body, again, in an effort to improve the realism of the user experience. One of two techniques is utilized for hair shading: one that works per-vertex and one that works per-pixel.

Per-Vertex Shading

The per-vertex hair shading technique chooses the right normal to make standard hardware lighting work by projecting the light vector L and the specular half vector H onto the disk of normals defined by the hair tangent T.

$H = (L+E)/2$ $N_H = H - (T \cdot H)T$ $N_L = L - (T \cdot L)T.$

Ideally, hardware would compute two lighting terms with two normals, one for specular $N_H$ and one for diffuse $N_L$. Since current graphics hardware is limited to a single normal, a weighted combination of the two computed normals is used and a portion of the underlying mesh's normal is added to add silhouette terminator shading:

$N = \alpha_L N_L + \alpha_H N_H + \alpha_O N_O.$

The variables may be set as follows:

$\alpha_L = 0.5;$ $\alpha_H = 0.4;$ and $\alpha_O = 0.1.$

The normal is then provided to the graphics hardware to be lit with the typical graphics hardware lighting model. The lighting modulates both the volume texture and the alpha-blended lines.

Per-Pixel Shading

The per-pixel shading technique works only for directional lights and a non-local viewer and uses the hardware texture matrix to encode the position of the light and the eye, and a two-dimensional lookup to compute the per-pixel shading.

In accordance with a per-pixel shading implementation, render engine 216 implements a hair shading characteristic in accordance with the following formula:

$$(u, v) = [T]\left[\frac{L}{H} \cdot \frac{H}{2}\right] = \left(T \cdot \frac{L}{2}, T \cdot \frac{H}{2}\right).$$

T is the hair direction stored at each vertex. L is the light direction. H is the half-vector between the eye and the light. Used below, $K_A$, $K_D$, and $K_S$ are the ambient, diffuse, and specular colors.

For the shading texture indexed by the (u,v) coordinates computed above:
Shading(u, v)=$K_A$+$K_D$(1−$LT^2$)+$K_S$pow(sqrt(1−$HT^2$, specular_exp)

$$LT = 2u \quad 0 < u < 1/2$$
$$2u - 1 \quad 1/2 < u < 1$$
$$Ht = 2v \quad 0 < v < 1/2$$
$$2v - 1 \quad 1/2 < v < 1.$$

A low resolution 32×32 texture suffices to encode the slowly changing lighting.

The normalization problem seen in the per-vertex approach (some sparkling at the tips of the hairs) is avoided with the per-pixel approach because the projection is coded in the texture and therefore avoids calculations with near-zero-length normals.

To compute u and v at runtime, T is stored as a set of texture coordinates, and the texture matrix is loaded with the current L and H vectors. According to one implementation, the well-known Banks self-shadowing approximation is employed to darken the shells near the skin.

Visibility: Since the triangles associated with the shells intersect each other in space, there does not exist a correct visibility order for rendering them. The shells offer the best visual approximation where the surface is oriented towards the viewer.

Level-of-detail control: As the rendered object recedes in the distance, render engine 216 can reduce the number of rendered shells. However, abruptly changing the number of shells can result in visual pops. Accordingly, render engine 216 makes such level-of-detail transitions visually smooth by blending between shell textures as follows.

Given a set of shell textures, render engine 216 composites together successive pairs of shells to form even shells of the coarser level, while leaving odd shells of the coarser level completely transparent. Render engine 216 repeats the transition until only one shell remains. When the graphics hardware has finished transitioning to a coarser level over the entire model, render engine 216 omits rendering of odd-numbered shells altogether at the finer level. Render engine 216 computes the schedule of the blend based, at least in part, on the distance from the viewer to the object. Inter-level blending is performed on the volume texture patch before the full shell rendering.

Programmable vertex shaders: According to one implementation, render engine 216 leverages the surface detail engine 204 and programmable vertex shaders (not shown) of the host computing system to accelerate shell rendering. More particularly the vertex shaders accelerate shell rendering insofar as they directly evaluate the geometric offsets between shells, in fact using only two additional shader instructions. Use of such programmable vertex shaders is anticipated within the spirit and scope of the present invention.

Render Engine Interactive Parameters

In addition to traditional camera and lighting parameters, render engine 216 also provides local interactive control over a number of aspects of surface detail. According to one example implementation, render engine 216 provides local interactive control over three aspects of the hair model—color, length, and direction. These attributes are specified as fields on the surface mesh. According to one implementation, render engine 216 computes for each mesh vertex a color and a vector $c_v$ encoding length and direction information.

Hair color: Based, at least in part on the graphics hardware capability, render engine 216 computes the vertex colors over the face and edge of the model. That is, according to one example implementation, render engine 216 linearly interpolates the vertex colors over each face and edge, in order to modulate the shell and fin textures.

Hair length: As introduced above, render engine 216 generally utilizes by default 16 shell textures, spaced apart by one thousandth of the model diameter. Accordingly, render engine 216 enables adjusting the length of the rendered hair by varying the number and spacing of these layers. For local control, render engine 216 offsets the shell layers at each vertex by a fraction of $c_v$. It has been determined, however, that making the spacing between layers too large (i.e., for very long hair) can lead to visible artifacts such as, for example, straightening curly hair, or revealing the discrete nature of the layers. Thus, render engine 216 generates very long hair by adding layers to the model, at the expense of rendering performance.

Hair direction: As introduced above, hair can be combed by shearing the geometries of the shells with respect to the base surface. Shearing is achieved by adding a tangential component to the vector $c_v$ stored at each mesh vertex. The user can then globally control the slant of the hair, adjusting from hair standing straight up to hair tilted at 45°.

Figure 4:
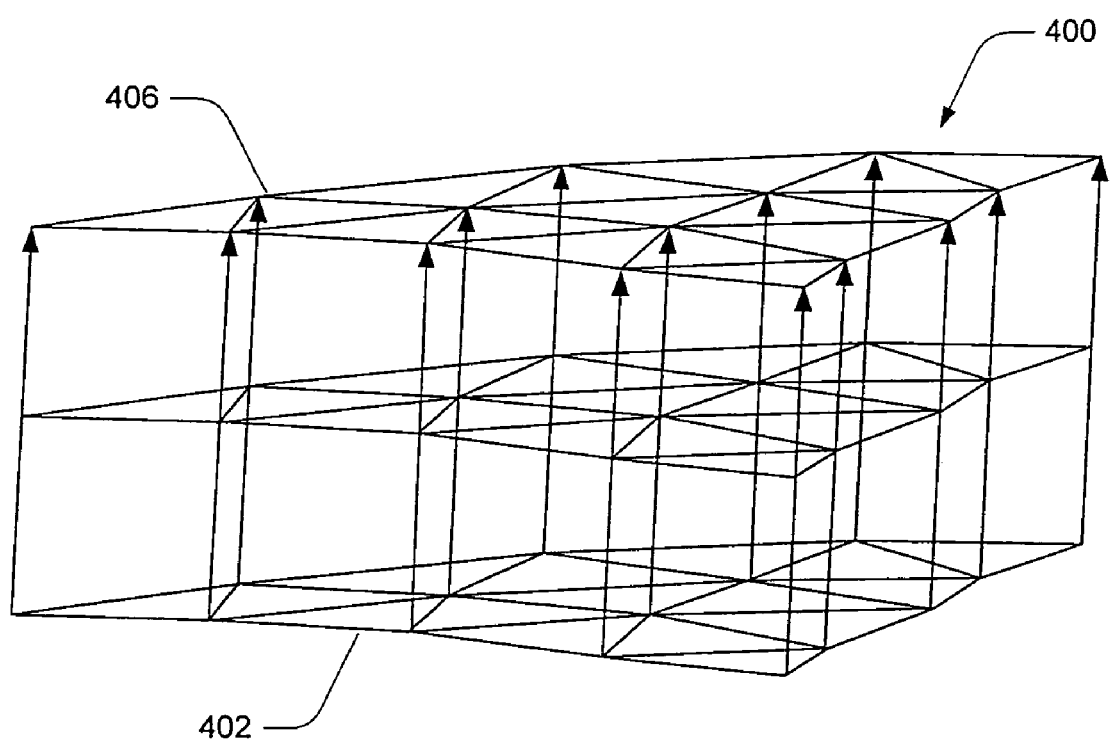
FIG. 4 graphically illustrates runtime rendering of offset shells to cover geometric surfaces, in accordance with the teachings of the present invention.

FIG. 4 graphically illustrates runtime rendering of offset shells, in accordance with the teachings of the present invention. As introduced above, render engine 216 generates the original mesh 402 and concentric shells 406, to provide realistic surface detail.

Example Operation and Implementation

Having introduced the functional and architectural elements of the present invention with reference to FIGS. 1 through 4, an example operation and implementation will be further developed with reference to FIGS. 5 and 6, below.

Figure 5:
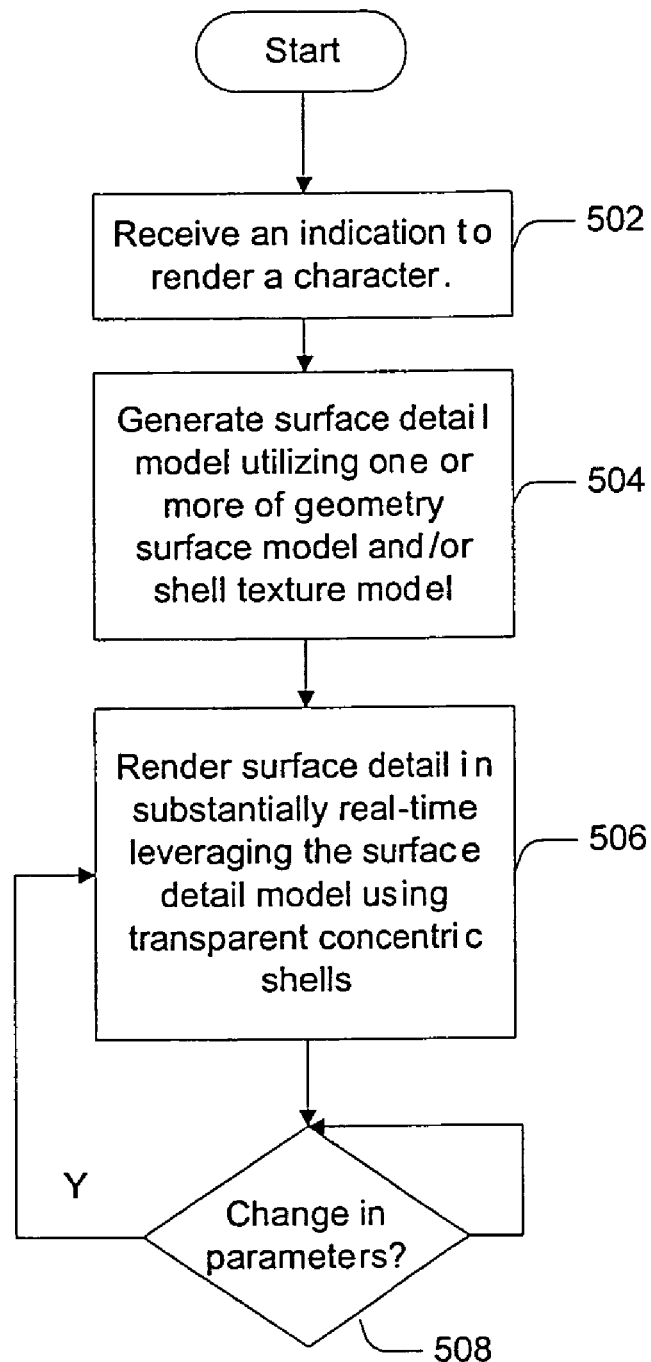
FIG. 5 illustrates a flow chart of an example method for rendering a life-like representation of a character in substantially real-time, according to one example implementation of the present invention.

FIG. 5 illustrates a flow chart of an example method for rendering a life-like representation of a character in substantially real-time, according to one example implementation of the present invention. As introduced above, the general method involves generating a surface detail model comprising skin and shell detail information, which is then leveraged by a render engine (e.g., 216) to provide realistic surface detail in near real-time. According to one implementation, at runtime, the geometric surface and concentric shells are rendered, in that order, to provide the realistic surface detail for an object.

As shown, the method of FIG. 5 begins with block 502 wherein modeling agent 104 receives an indication to render a character. In accordance with the teachings of the present invention introduced above, modeling agent 104 receives the indication via controller 202, and selectively invokes an instance of surface detail engine 204 to generate a surface detail model for the object, which is subsequently leveraged to provide impressive surface detail features in substantially real-time.

In block 504, surface detail engine 204 dynamically generates a surface detail model for the object. More specifically, in accordance with the teachings of the present invention, surface detail engine 204 selectively invokes the geometry preprocessing module 206 and shell texture generation module 208 to develop an extensive surface detail model for the object, for use by render engine 216. An example method for generating just such a surface detail model is presented below, with reference to FIG. 6.

In block 506, render engine 216 dynamically generates a rendered image of the character complete with surface detail in substantially real-time by leveraging the surface detail information contained within the surface detail model. According to one example implementation, introduced above, render engine 216 dynamically generates surface detail based, at least in part, on a number of parameters including, for example, user controlled runtime parameters such as hair length, hair color and lighting attributes. The rendered image remains constant until, in block 508, render engine 216 detects a change in such parameters, wherein the process proceeds back to block 606 for re-rendering in accordance with the new parameters.

Figure 6:
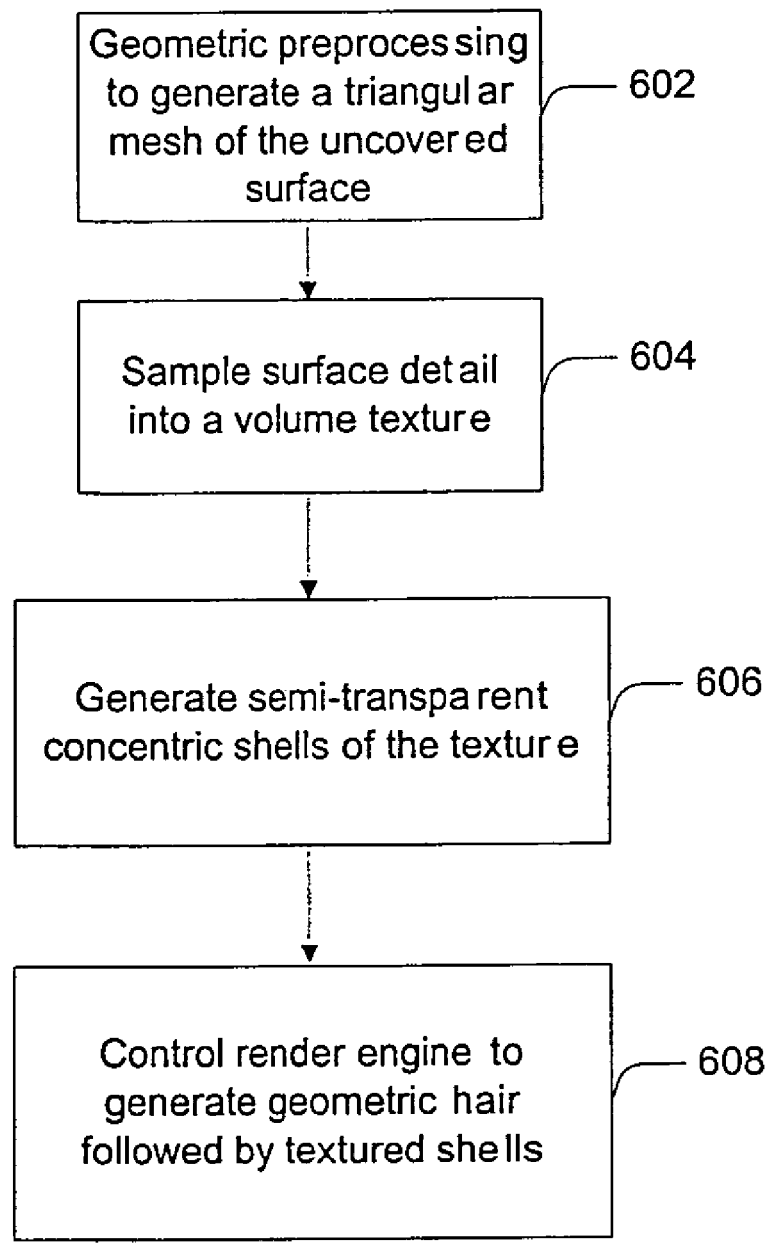
FIG. 6 is a flow chart of an example method for generating surface, according to one example embodiment of the present invention.

Turning, briefly, to FIG. 6 a flow chart of an example method for generating a surface detail model is presented, according to one example embodiment introduced above. In accordance with the teachings of the present invention, the method of FIG. 6 begins with block 602 wherein the controller 202 surface detail engine 204 selectively invokes geometric preprocessing module 206 to generate a geometric mesh model of the object's surface. In addition, geometric preprocessing module 602 samples surface detail (e.g., of the skin) into a volume texture, block 604.

In block 606, semi-transparent concentric shells are generated by shell generation module 208, as disclosed above. Finally, having developed the surface detail model, modeling agent 104 provides the render engine (e.g., 216) with instructions for optimally rendering the surface detail, i.e., rendering the geometric (surface) skin/hair followed by the layers of concentric shells (block 608).

Alternate Embodiments

FIG. 7 is a block diagram of a storage medium having stored thereon a plurality of instructions including instructions to implement the innovative modeling agent 104 of the present invention, according to yet another embodiment of the present invention. In general, FIG. 7 illustrates a storage medium/device 700 having stored thereon a plurality of executable instructions 702 including at least a subset of which that, when executed, implement the innovative modeling agent 104 of the present invention.

As used herein, storage medium 700 is intended to represent any of a number of storage devices and/or storage media known to those skilled in the art such as, for example, volatile memory devices, non-volatile memory devices, magnetic storage media, optical storage media, and the like. Similarly, the executable instructions are intended to reflect any of a number of software languages known in the art such as, for example, C++, Visual Basic, Hypertext Markup Language (HTML), Java, extensible Markup Language (XML), and the like. Moreover, it is to be appreciated that the storage medium/device 700 need not be co-located with any host system. That is, storage medium/device 700 may well reside within a remote server communicatively coupled to and accessible by an executing system. Accordingly, the software implementation of FIG. 7 is to be regarded as illustrative, as alternate storage media and software embodiments are anticipated within the spirit and scope of the present invention.

Although the invention has been described in language specific to structural features and/or methodological steps, it is to be understood that the invention defined in the appended claims is not necessarily limited to the specific features or steps described. Rather, the specific features and steps are disclosed as exemplary forms of implementing the claimed invention.

The invention claimed is:

1. A method comprising:
   generating a mesh grid representation of surfaces of the object;
   simulating surface detail in each of the grid elements;
   sampling the surface detail into a volume texture on a per-grid element basis; and
   smoothly transitioning in real time between close-up views, intermediate views, and distant views of the surface detail by utilizing different surface detail modeling techniques associated with different sets of viewing parameters;
   wherein the close-up views display line-drawn detail of the surface detail, the intermediate views include a number of semi-transparent volume shells, the number varying in relation to the distance of the intermediate view from the surface detail, and wherein the distant views display an aggregate of the surface detail, including lighting and shadow effects.

2. A method according to claim 1, further comprising parameterizing a texture in each of the grids.

3. A method according to claim 2, wherein parameterizing the texture comprises:
   identifying one or more interactive control and/or viewing parameters associated with each grid of the mesh which determine, at least in part, what elements of the surface detail model are used to render surface detail in that grid element.

4. A method according to claim 3, further comprising:
   generating a shell texture model for each grid of the mesh based, at least in part, on the parameterization of the grid elements.

5. A method according to claim 1, wherein developing a surface detail model comprises:
   generating a shell texture model for each element of a dynamically generated grid representation of uncovered surfaces of an object.

6. A method according to claim 5, wherein generating a texture model comprises:
   generating a mesh grid representation of uncovered surfaces of the object;
   simulating hair in each of the grid elements; and
   sampling the hair into a volume texture on a per-grid element basis.

7. A method according to claim 6, further comprising:
   utilizing the volume texture to generate the semi-transparent concentric shells of the volume texture, which are layered over select areas of the object surface.

8. An apparatus comprising:
   a modeling agent, to develop a surface detail model utilizing a modeling technique appropriate for a given set of viewing parameters; and
   a rendering engine, responsive to the modeling agent, to render surface detail in accordance with the developed surface detail model over an object surface, wherein the rendering engine is capable of smoothly transitioning in real time between close-up views to distant views of the surface detail by utilizing different surface detail modeling techniques associated with different sets of viewing parameters; wherein the rendering engine transitions smoothly between:

a first technique of displaying each surface detail rendered with individual lines;

a second technique of displaying the surface detail model as concentric shells of volume texture, wherein the number of concentric shells is inversely related to the distance of the view; and a third technique of displaying the surface detail model as an aggregate view, including lighting and shadow effects.

9. An apparatus according to claim 8, the modeling agent comprising:

a geometry preprocessor module, to generate a mesh grid representation of uncovered surfaces of the object, to simulate hair in each of the grid elements, and sample the simulated hair into a volume texture on a per-grid element basis.

10. An apparatus according to claim 9, wherein the geometry preprocessor parameterizes a texture in each of the grid elements.

11. An apparatus according to claim 9, wherein the geometry preprocessor generates the concentric shell texture model for each grid element of the mesh based, at least in part, on the parameterization of the grid element(s).

12. An apparatus according to claim 8, wherein the modeling agent generates a shell texture model for each element of a dynamically generated mesh grid representation of uncovered surfaces of an object.

13. An apparatus according to claim 8, the modeling agent comprising:

a shell generator module, to utilize the volume texture and generate a semi-transparent concentric shell(s).

14. An apparatus according to claim 8, further comprising:

a memory device including a plurality of executable instructions; and a controller, coupled to the memory device, to execute at least a subset of the plurality of executable instructions to implement the surface modeling agent.

15. A method, comprising:

preprocessing texture surfaces of a 3-dimensional object; and sampling the texture surfaces onto structural elements for rendering the 3-dimensional object on a 2-dimensional display, such that the sampling allows seamless transitioning in real time between modeling techniques to display a surface detail of the texture surfaces while zooming in and zooming out on the 2-dimensional object;

wherein close-up views during the zooming in display line-drawn detail of the surface detail, intermediate views between zooming in and zooming out include a number of semi-transparent volume shells, the number varying in relation to the distance of the intermediate view from the surface detail, and wherein the distant views during the zooming out display an aggregate of the surface detail, including lighting and shadow effects.

16. The method as recited in claim 15, wherein the sampling allows transitioning to a near zoom, wherein the surface detail is displayed as smallest elements of texture.

17. The method as recited in claim 15, wherein the sampling allows transitioning to an intermediate zoom, wherein semi-transparent concentric shells give the appearance of the texture surface, the number of semi-transparent concentric shells being inversely related to the distance of the view.

18. The method as recited in claim 15, wherein the sampling allows transitioning to a distant zoom, wherein the surface detail is represented as an aggregate surface parameterized to display lighting and shadow effects.

19. The method as recited in claim 15, wherein the surface detail comprises a volume texture of hair and a hair distribution.

20. The method as recited in claim 15, further comprising displaying multiple of the 2-dimensional objects, wherein each of the 2-dimensional objects has a different texture.

* * * * *